United States Patent [19]

Gleeson

[11] 4,356,019
[45] Oct. 26, 1982

[54] GLASS SPINNING VESSEL

[76] Inventor: Bernard Gleeson, 21, Clarence Grove Rd., Weston-super-Mare, Avon, England

[21] Appl. No.: 208,114

[22] Filed: Nov. 18, 1980

[30] Foreign Application Priority Data

Nov. 23, 1979 [GB] United Kingdom ................ 7940611
Nov. 23, 1979 [GB] United Kingdom ................ 7940612

[51] Int. Cl.³ .......................... C03B 5/16; C03B 5/22
[52] U.S. Cl. ......................................... 65/346; 65/1; 65/135; 65/347
[58] Field of Search ...................... 65/1, 135, 346, 347

[56] References Cited

U.S. PATENT DOCUMENTS

| | | | |
|---|---|---|---|
| 1,611,328 | 12/1926 | Arbogast | 65/347 X |
| 1,986,575 | 1/1935 | Honiss | 65/347 X |
| 2,465,283 | 3/1949 | Schlehr | 65/135 X |
| 3,328,144 | 6/1967 | Glaser | 65/135 X |
| 4,011,070 | 3/1977 | Hynd | 65/135 X |
| 4,155,731 | 5/1979 | Byrnes et al. | 65/1 |
| 4,195,982 | 4/1980 | Coucoulas et al. | 65/135 X |

FOREIGN PATENT DOCUMENTS 204189 4/1939 Switzerland ...................... 65/347

Primary Examiner—Robert L. Lindsay, Jr.
Attorney, Agent, or Firm—Wigman & Cohen

[57] ABSTRACT

In order to provide mixing between the freshly melted glass and that already in a glass melting vessel for spinning glass fibre, the vessel has a lateral extension having inlets for glass beads or pellets. These fall into a reception trough and the freshly molten glass passes over a first weir to a second reception trough normally just below the level of the glass in the vessel. The glass from the trough passes over a second weir. In order to prevent a direct access to the draw bar in the aperture a further trough and weir are provided. The draw bar may have nipples which are largely embedded in the plate so as to delay the onset of cooling as the glass passes through the nipples. This reduces the required temperature of entry to the nipples and enables the use of lower grade materials, such as alloy steel or nickel chromium alloy, for the plate and nipples.

9 Claims, 7 Drawing Figures

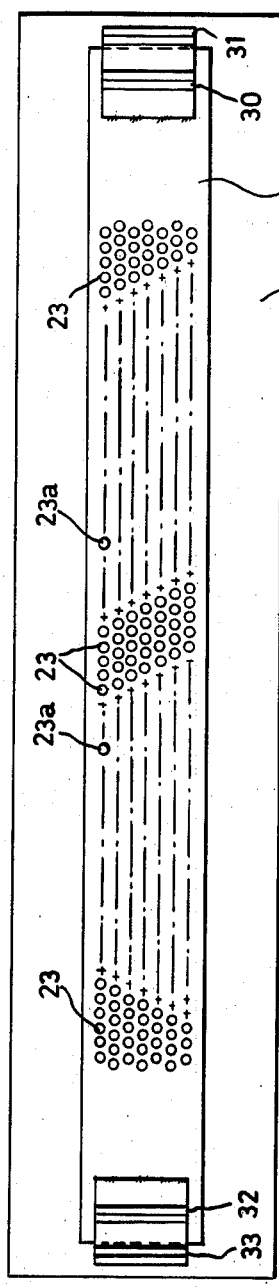
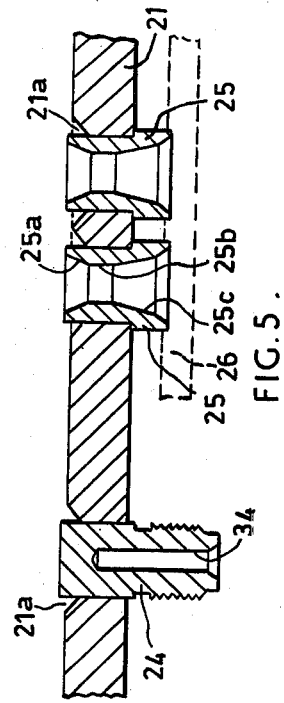
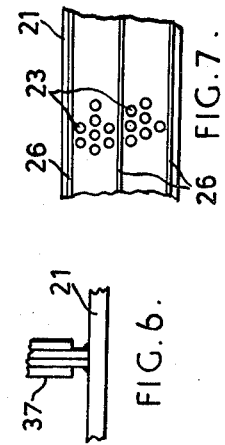
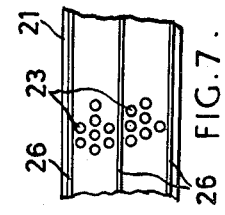
FIG. 4.
FIG. 5.
FIG. 6.
FIG. 7.

GLASS SPINNING VESSEL

This invention relates to pots, crucibles or other vessels from which glass to be spun into fibres is fed in a molten state.

Most glass fibre production is by the large scale direct melt process in which a glass melt is formed in a vessel and the molten glass is fed from there via ducts to a plurality of draw bars, each of which consists of a comparatively large number of nipples set in a precious metal plate. The glass is spun into fibres as it passes through the nipples and cools to plastic state and is then drawn down to the required gauge while still warm. Such a plant is essentially an integrated, continuous-production glass manufacturing and spinning plant and can only be run as a large production unit. It is also very expensive.

One form of small scale plant which has been proposed is a remelting plant, formed wholly of platinum, and therefore very expensive, to which glass beads are fed and from which glass fibre is spun.

It has been proposed to use a smaller scale production method for glass fibre in which pre-manufactured glass is fed to and remelted in a pot or crucible having a draw bar in the base thereof so that the process of fibre production may be carried out on a comparatively small scale, whereby small markets for glass fibre can be met by local production on an economic basis.

One of the problems that has been met in designing an appropriate pot or crucible for this purpose is that of ensuring adequate mixing between the freshly melted glass and the glass already in the pot or crucible. Normally, the pot or crucible is provided with heaters to control the temperature of the glass in the pot or crucible and the freshly melted glass is at a temperature somewhat lower than the required outlet temperature. However, this colder molten glass, being denser, tends to sink through the glass already in the pot or crucible, without being heated thoroughly to the required temperature and hence may reach the draw bar at the bottom of the pot or crucible at too low a temperature, so that it solidified prematurely in the spinning process.

Accordingly, it is an object of the present invention to produce a vessel in which means is provided to ensure adequate mixing of the fresh melted glass with the glass already in the vessel.

According to a first aspect of the present invention, there is provided a glass spinning vessel having, or adapted to have, a draw bar in a base thereof for spinning molten glass, the vessel including at least one glass inlet laterally offset from the position of the draw bar and located above a first reception trough separated by a first weir from a second reception trough itself separated from the main body of the glass in the vessel by a second weir.

It is preferred that the downstream wall of the second weir should itself be associated with a third trough and weir so that cooler glass passing over the said second weir and following the line thereof shall not have a direct path to the draw bar.

It has hitherto been customary, in order to get the necessary mechanical strength and wear resistance at the temperatures involved, to use draw bars and nipples of platinum. This material is of course extremely expensive and its use raises very considerably the overall cost of a glass fibre production complex.

For the proper spinning of glass fibre, the nipples have to have a considerable length, e.g. 8.5 mm, so that they extend for a large proportion of their length beyond the plate in which they are set.

Accordingly, cooling of the glass starts fairly high in the nipple, even if the plate is heated, as is usual, e.g. by having an electric current passed through it.

It has been proposed to use a plate of alloy sheathed with a noble metal or alloy, and nipples of noble metal or alloy, protruding below the sheet. This particular proposal has not been commercial used, apparently due to the difficulty of maintaining the integrity of the sheathing at an economic cost.

It has now been discovered that by ensuring that a substantial proportion of the length of the nipple is embedded in the plate, the onset of cooling can be delayed so that the temperature of the glass entering the nipple can be at a lower level, e.g. 1100° C. rather than say 1220° C., and this low temperature enables the use of temperature resistant alloys in place of platinum to be acceptable.

Accordingly recourse may be had to the use of a draw bar comprising a plate having a plurality of nipples set therein, in which the plate and the nipples are formed of a temperature resistant alloy and the thickness of the plate is such that a substantial proportion of the length of each nipple is embedded in the plate.

The use of alloys rather than platinum makes the use of a thick plate economic and the lower temperature thus made feasible makes the use of alloy practicable. It is envisaged that up to about one half of the overall length the nipple may protrude from the plate.

The plate and nipples may be of alloy steel or other temperature resistant alloy, such as a nickel chromium alloy.

Such a draw bar may also be used in direct melt plant.

According to a third aspect of the invention, there is provided a method of producing glass fibre comprising spinning molten glass through a draw bar according to the invention as set forth above.

The invention will be further described with reference to the accompanying drawings, in which:

FIG. 4 is a plan view of a draw bar for use in a vessel according to a preferred form of the invention;

FIG. 5 is a fragmentary section on an enlarged scale illustrating some detals of FIG. 4;

FIG. 6 is a fragmentary side elevation showing a modification of a detail; and

FIG. 7 is a fragmentary bottom plan view showing another modification.

Figure 3:
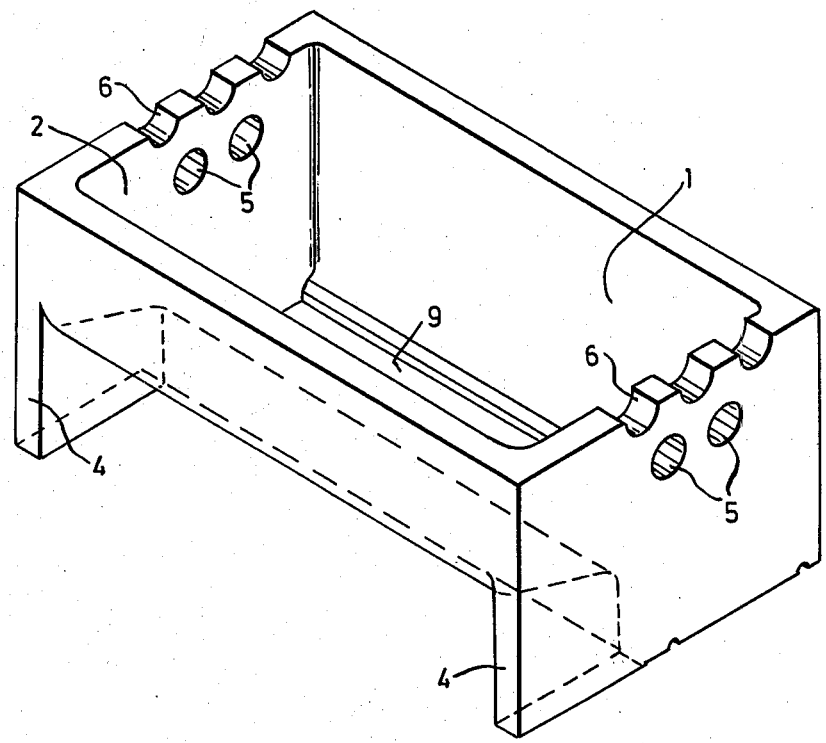
FIG. 3 is a perspective view of the pot or crucible with the cover removed.

As shown in the drawings, the pot or crucible is in the form of an elongate rectangle which includes a principal crucible portion 1 of full depth and a full length lateral extension 2. The whole pot or crucible is covered by a cover or lid 3, which has been omitted from FIG. 3 for clarity of illustration. For mechanical stability, the end walls have been extended, as shown at 4, below the lateral extension 2.

Purely by way of illustration, it is envisaged that the typical dimension of a pot or crucible as illustrated would be an overall length of 700 mm with a wall thickness of approximately 31 mm at the bottom tapering to 28 mm at the top. The internal width of the full depth portion 1 would be in the region of 185 mm, and the overall height, excluding the cover some 300 mm. Again, purely as an example, it is envisaged that the crucible and its lid 3 could be made of sillimanite, or other alumina silicate having a high alumina content.

In order to heat the glass within the pot or crucible, electrical heaters would be housed in, and extend between, holes 5 formed in the end walls and also in holes formed by co-operating portions 6 in the end walls and matching portions 6a in the lid or cover 3.

Figure 1:
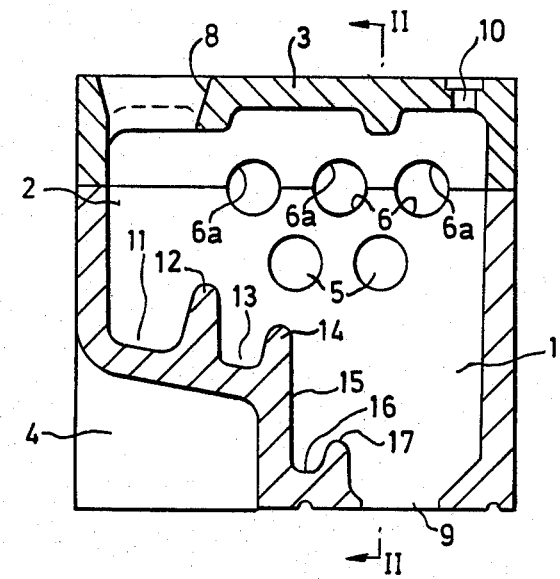
FIG. 1 is a transverse section through a preferred form of pot or crucible forming a vessel according to the present invention, taken along the line I—I of FIG. 2.

FIG. 1 shown at 10 one of a number of apertures in the lid or cover 3 which probes or instruments may be inserted. One such probe is a reciprocating level probe to detect if the glass level is sufficiently high and to institute feed of glass if it is not. Another may be a fixed high level probe to detect if the glass level is too high and to shut off feed and sound an alarm. Another may be a thermo-couple to monitor the temperature at a given point in the pot or crucible.

Figure 2:
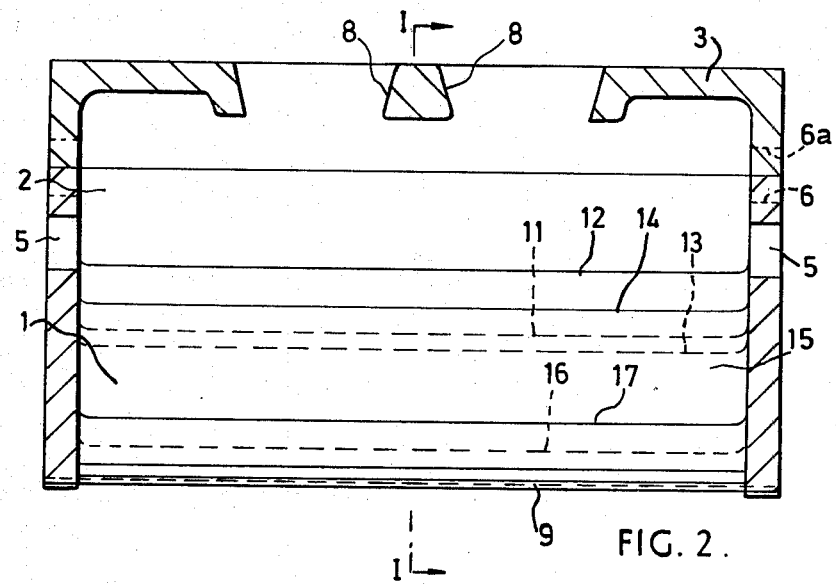
FIG. 2 is a section on the line II—II of FIG. 1.

It will be seen particularly from FIG. 2 that the lid or cover 3 is formed with a pair of feed apertures 8 which are tapered to receive chimneys (not shown) down which solid plates or beads of glass may be introduced into the lateral extension 2 of the pot or crucible for melting. In order to ensure adequate mixing of this somewhat cooler freshly molten glass with the glass already in the crucible, before finally passing out through an aperture 9 in the full depth portion 1 in which, in use, a draw bar would be located, a series of weirs is provided to lengthen the flow path for the newly introduced glass.

If the fresh glass were introduced directly into the full depth portion 1, there would be a distinct tendency for it to melt and flow as a stream down the wall and into the region of the draw bar, since, being cooler and therefore denser, it will have a tendency to sink and there would be insufficient mixing between the freshly molten glass and the hotter glass already in the crucible. In order to overcome this, the lateral extension 2 is provided with a first reception trough 11 into which the solid glass first arrives and mixes with molten or partially molten glass which has already undergone some heating. Freshly molten glass passes over a first weir 12 into a second reception trough 13. While in the first reception trough the glass is brought to a molten state, and when the glass reaches the second reception trough, it is subjected to further heating. From the second reception trough 13, the glass passes over a second weir 14 into the full depth portion 1. By making the glass follow a fairly sinuous path into the full depth portion 1, it is subjected to considerable heating in its passage, and in addition has ample opportunity to mix with glass already in the crucible. The level of the glass in the crucible is above the level of the weir 14 and below that of weir 12 and this enhances the mixing as the freshly molten glass is exposed to and mixes with the main body of the glass as it enters trough 13.

However, in order to provide still further mixing, it is arranged that even if glass passing over the weir 14 follows closely on the inner wall 15 thereof, it still does not have a direct path to the aperture 9 and draw bar therein. The lower portion of the wall 15 leads into a further trough 16 defined in part by a weir 17 so that the layer of glass passing down the wall 15 has to pass up and over the weir 17, which gives it still further opportunities for being heated by and mixing with the glass already in the crucible.

It has been found that by the use of the troughs 11, 13 and 16, very good mixing of the freshly molten glass with that already in the crucible is achieved.

FIG. 4 shows a draw bar in the form of a plate 21 of an appropriate heat resistant base metal alloy, such as an alloy steel or a nickel/chromium alloy, suitable for operating with molten glass at temperatures up to about 1100° C. The plate 21 is surrounded by a somewhat thinner flange 22 integrally formed therewith. The plate is formed with a pattern of staggered rows of holes, as generally indicated in FIG. 5 at 23, and in the particular example shown, there are a total of 405 holes arranged in seven rows. Two of the holes, indicated at 23a, will be occupied by thermocouples mounted in holders 24 as illustrated in FIG. 5, and the other 403 holes will be used for mounting of glass spinning nipples 25, also as illustrated in FIG. 5.

FIG. 5 shows the nipples 25 and holders 24 in the "as inserted" state in which they protrude somewhat above the plate 21. Before use, they are plasma welded so that the protruding parts fill cavities shown at 21a as indicated by the broken lines.

In order to prevent any excessive cooling as the glass passes through the nipples, the plate 21 has heavy electrical current passed therethrough by means of terminals 30, 31, 32 and 33, each of which is formed by a pair of plates welded together, and the plate pairs being then welded to the plate 21.

As indicated in FIG. 5, the thermo-couple holder has a cavity 34 to receive a thermo-couple by which the temperature of the plate 21 can be regularly monitored.

A modified terminal arrangement for the plate heating is shown in FIG. 6. Each pair of terminals 32, 33 and 30, 31 is replaced by a single terminal 37 made up of four plates, of which only two extend as far as the plate 21 and are welded to it. The extra current loading on these two plates provides localised heating near the ends of the plate 21, which is useful in maintaining an even temperature along the whole length of the plate 21.

Each of the nipples 25 shown comprises a lead-in section 25a, a throat 25b and a lead-out section 25c, part of which protrudes beyond the plate 21. A major proportion of the length of the nipples 25 is within the confines of the plate 21 and only a minor proportion extends below the plate 21 into the ambient atmosphere.

In the particular example, each nipple 25 may have an overall length of 8.5 mm of which 3 mm projects below the plate 21 for the onset of cooling so that the glass is sufficiently solidified to leave the nipple.

The flange 22 may have a thickness of 1.5 mm. The diameter of the holes for the nipples 25 may be 6 mm and the holes may be arranged at 9 mm centres within the rows, with the rows being 9 mm apart.

The dimensions are chosen such that the temperature of the molten glass in contact with the plate and entering the nipples can be a minimum, whereby the use of alloy steels, or other high temperature resistant alloys, rather than platinum for the plate 21 and nipples 25 becomes permissible. The nipples have to be sufficiently long for the glass to form into filaments as it passes therethrough and to start to cool in the latter part of the nipple. By ensuring that the filament is properly formed in the part of the nipple which is actually embedded in the plate 21, and therefore prevented from premature cooling, the temperature of the glass being fed in can be kept down. This effect is further enhanced by the use of an electric current to heat the plate. Also, cooling by means of water circulating through pipes 26 may be used to provide rapid cooling of the glass at the very end of the nipple and on emergence therefrom. FIG. 7 shows a suitable arrangement of such cooling pipes 26 in a modified form of plate 21. It will be seen that a pipe 26 is arranged at each side of the rows of holes 23 and that a further pipe 26 is arranged between two groups of three rows of holes 23.

Various modifications may be made within the scope of the invention.

I claim:

1. In a glass spinning vessel for receiving pre-manufactured glass in solid form, remelting said glass and feeding the same from a main body of glass to a draw bar in the base of the vessel: the improvement comprising said vessel including a lateral extension defining a reception and melting zone laterally offset from and above the location of the draw bar, at least one glass inlet located above the reception and melting zone, said reception and melting zone comprising a first reception trough for receiving glass to be melted from the inlet, a first weir, a second reception trough separated from the first reception trough by the first weir, and a second weir separating the second reception trough from the main body of glass in the vessel, whereby the freshly melted glass is constrained to follow a sinuous path over the first weir, through the second reception trough and over the second weir before joining the main body of glass in the vessel.

2. A vessel as claimed in claim 1, wherein said vessel comprises a crucible having a cover provided with feed apertures comprising said inlet, said apertures being located over said first reception trough, said crucible having end walls with openings formed therein for receiving heating means, said openings being arranged above the level of the main body of glass in said vessel.

3. A vessel as claimed in claim 2, wherein said crucible is integrally formed in one piece.

4. A vessel as claimed in claim 1, in which a downstream wall of the second weir is associated with a third trough and weir so that cooler glass passing over the said second weir and following the line thereof does not have a direct path to the draw bar.

5. A vessel as claimed in claim 1, in which means is provided for maintaining the glass level in the vessel between the levels of the first and second weirs.

6. A vessel as claimed in claim 1, including a draw bar, comprising a plate having a plurality of nipples set therein, in which the plate and the nipples are formed of a temperature resistant alloy and the thickness of the plate is such that a substantial proportion of the length of each nipple is embedded in the plate.

7. A vessel as claimed in claim 6, in which the plate and nipples are formed of alloy steel.

8. A vessel as claimed in claim 6, in which the plate and nipples are formed of a nickel chromium alloy.

9. A vessel as claimed in claim 6, in which the plate has terminals attached thereto for passage of a heating electric current through the plate.

* * * * *